United States Patent
McMahon

(10) Patent No.: US 12,123,973 B1
(45) Date of Patent: Oct. 22, 2024

(54) RADAR ACTIVATED ANTI-COLLISION DEVICE

(71) Applicant: Kevin Patrick McMahon, Plano, TX (US)

(72) Inventor: Kevin Patrick McMahon, Plano, TX (US)

( * ) Notice: Subject to any disclaimer, the term of this patent is extended or adjusted under 35 U.S.C. 154(b) by 155 days.

(21) Appl. No.: 17/402,283

(22) Filed: Aug. 13, 2021

Related U.S. Application Data

(60) Provisional application No. 63/065,207, filed on Aug. 13, 2020.

(51) Int. Cl.
G01S 7/41 (2006.01)
G01S 7/02 (2006.01)
G01S 13/931 (2020.01)

(52) U.S. Cl.
CPC ............... *G01S 7/411* (2013.01); *G01S 7/028* (2021.05); *G01S 13/931* (2013.01); *G01S 2013/9329* (2020.01)

(58) Field of Classification Search
CPC ........ G01S 7/411; G01S 7/028; G01S 13/931; G01S 2013/9329; H01Q 15/18; H01Q 15/23
USPC ............................................................ 342/7
See application file for complete search history.

(56) References Cited

U.S. PATENT DOCUMENTS

| | | | | | |
|---|---|---|---|---|---|
| 4,119,965 A | * | 10/1978 | Kaszyk | ................. | H01Q 15/20 342/8 |
| 4,843,396 A | * | 6/1989 | Macikunas | ............. | G01S 13/75 342/7 |
| 5,097,265 A | * | 3/1992 | Aw | ......................... | H01Q 15/18 342/9 |
| 6,120,154 A | * | 9/2000 | Ishizaka | .................... | G01S 7/02 359/837 |
| 2015/0130651 A1 | * | 5/2015 | Mogridge | ............. | G01S 13/931 342/7 |

FOREIGN PATENT DOCUMENTS

| KR | 101014772 B1 | * | 2/2011 | ............... | G01S 7/03 |
|---|---|---|---|---|---|
| WO | WO-0241448 A1 | * | 5/2002 | ............... | H01Q 1/27 |

OTHER PUBLICATIONS

KR_101014772_B1_I_translate.pdf—translation of KR_101014772_B1 (Year: 2011).*
D. Belgiovane and C. -C. Chen, "Micro-Doppler characteristics of pedestrians and bicycles for automotive radar sensors at 77 GHZ," 2017 11th European Conference on Antennas and Propagation (EUCAP), Paris, France, 2017, pp. 2912-2916, doi: 10.23919/EuCAP.2017.7928457. (Year: 2017).*

* cited by examiner

Primary Examiner — Olumide Ajibade Akonai
(74) Attorney, Agent, or Firm — Jeffrey Roddy

(57) ABSTRACT

A reflective device includes a novel corner cube reflector design and application, with unique and specific configurations and geometries of singular or multiple corner reflectors. The device can significantly increase the Radar Cross Section (RCS) measurement of the target object (e.g. cyclist and pedestrians) and greatly amplify the presence of the target object at multiple angles, orientations, distances and ranges to the vehicles collision avoidance radar system.

9 Claims, 7 Drawing Sheets

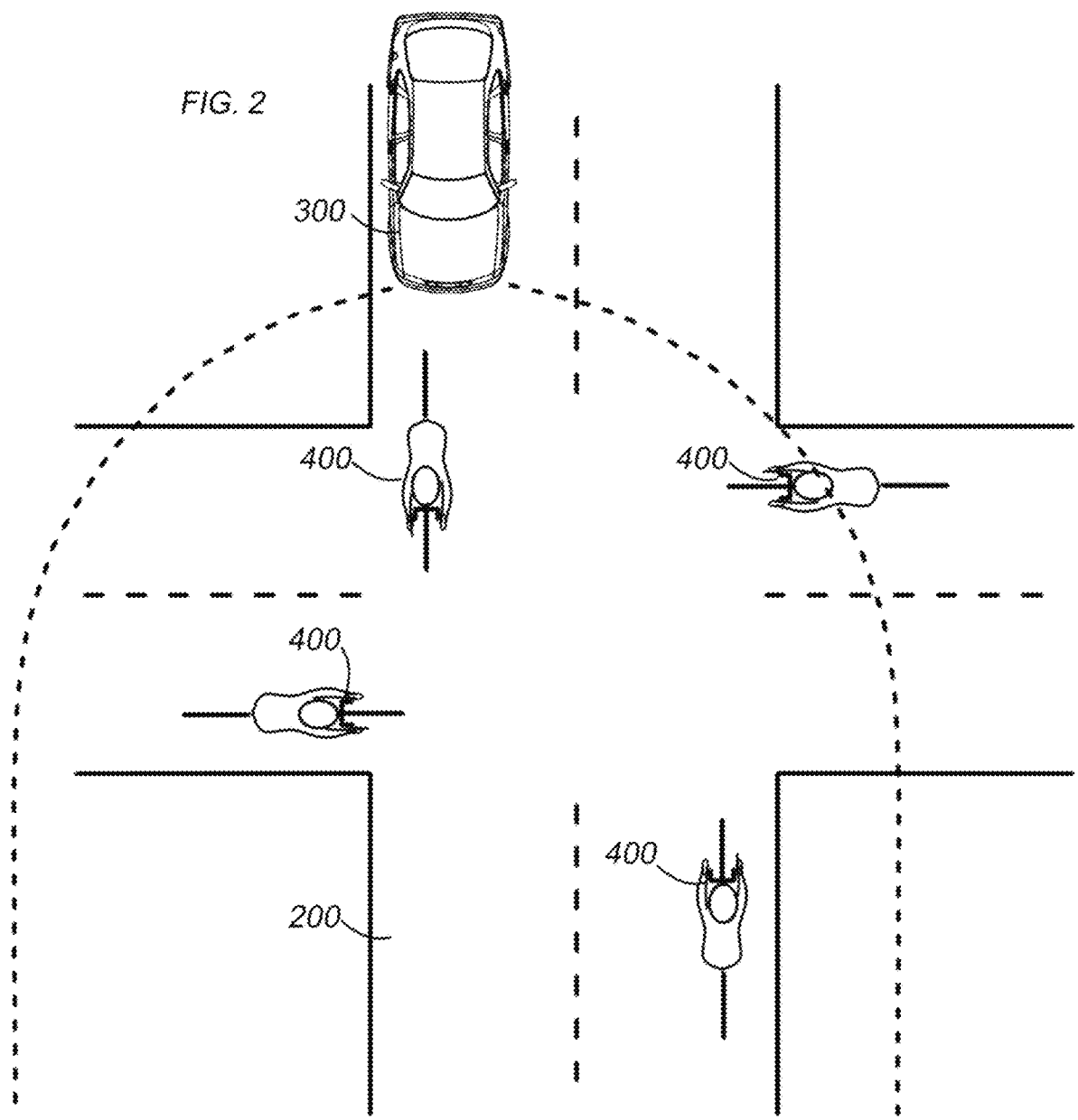

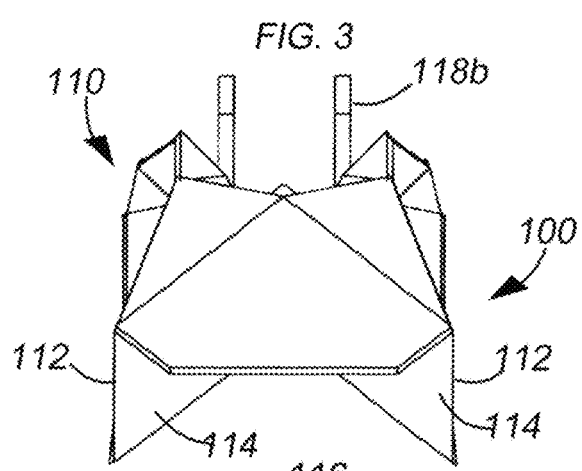
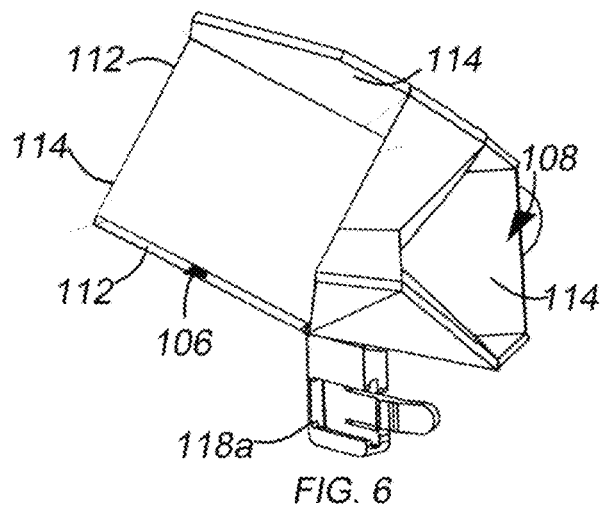
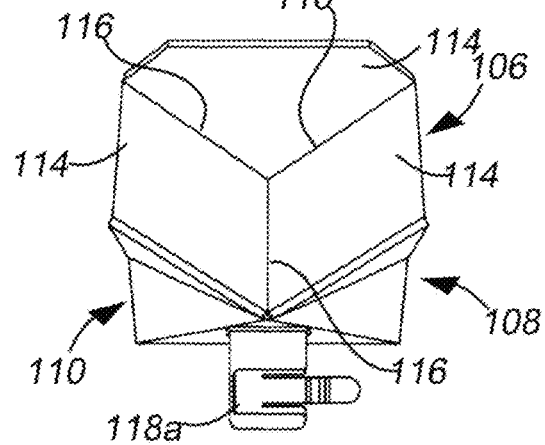
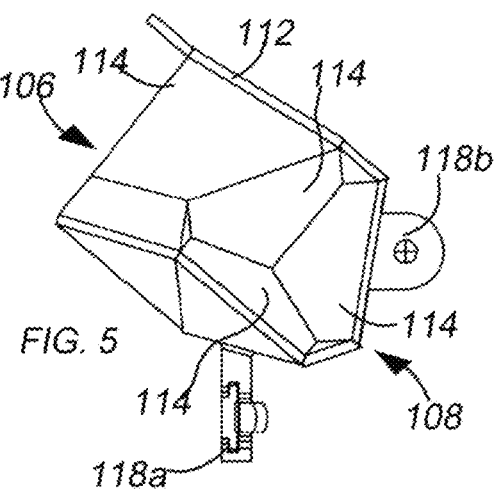
FIG. 3
FIG. 4
FIG. 5
FIG. 6

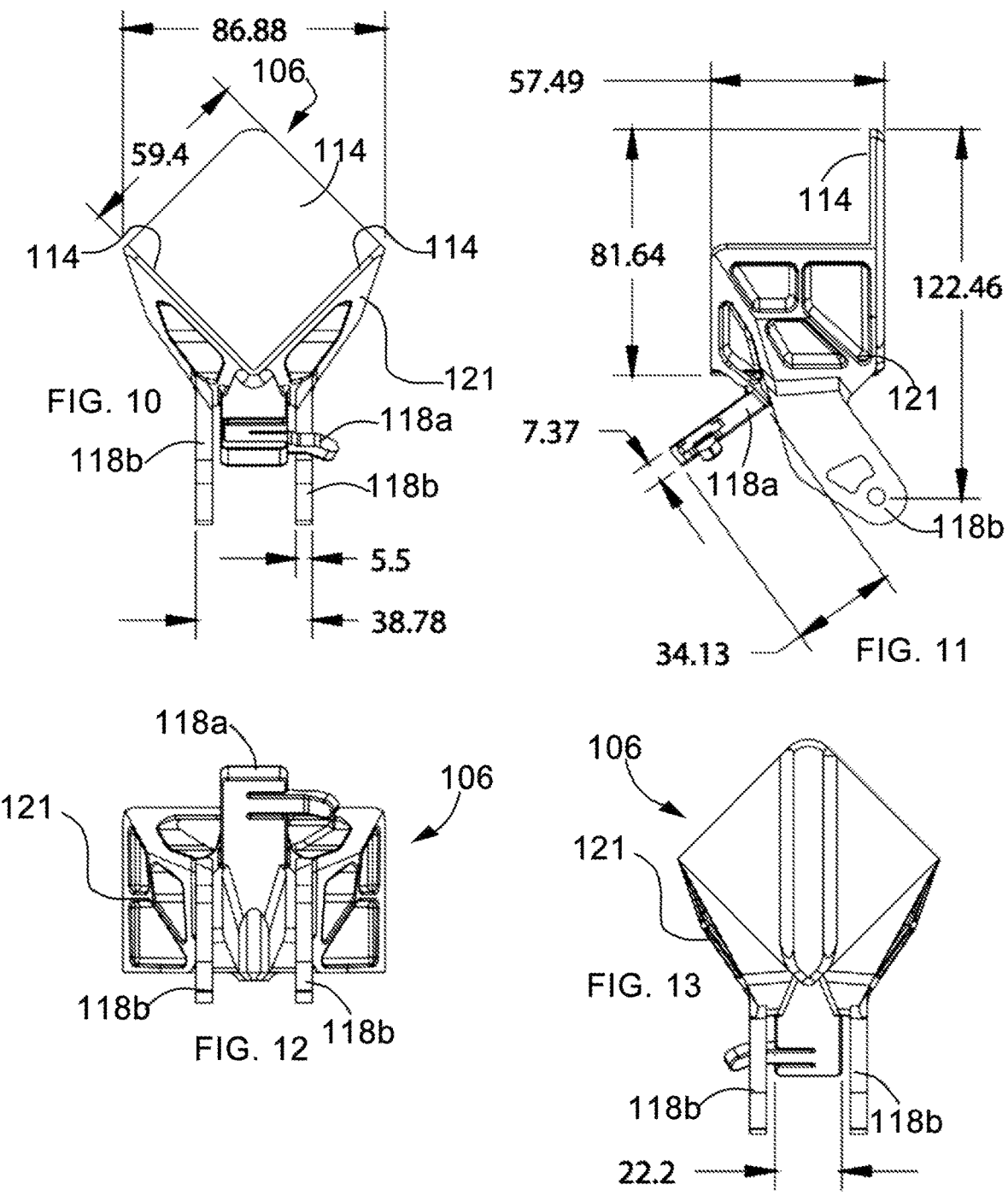

RADAR ACTIVATED ANTI-COLLISION DEVICE

CROSS-REFERENCE TO RELATED APPLICATIONS

This Non-Provisional Application claims priority benefit to U.S. Provisional Application No. 63/065,207 entitled "Radar Activated Anti-Collision Device" filed Aug. 13, 2020.

TECHNICAL FIELD

The subject of this invention pertains to the growing fitment of motor vehicles with collision avoidance systems (CAS) commonly known in the market as Forward Collision Warning, Adaptive Cruise Control, Automatic Emergency Braking systems and similar autonomous vehicle based CAS technologies.

BACKGROUND

Well known vehicle safety technologies are designed to alert operators and their vehicles about the presence of other vehicles in order to avoid collisions between vehicles and other objects on roadways. These collision avoidance systems utilize a suite of object detection sensors including radar, vision/camera, sonar, and sometimes 3-D laser scanning (LIDAR) that comprise a vehicle's driver assistance capabilities. Radar sensors are a fundamental base technology present on virtually all vehicles with driver assistance capabilities. Fitment of collision avoidance systems is now near universal, and by October 2021, all the major vehicle manufacturers have committed to the federal government to making Automatic Emergency Braking systems standard equipment on all vehicles sold in the U.S. Additionally, the European Union has essentially mandated the fitment of AEB on all cars sold in Europe since 2016 through its EuroNCAP program. China, Japan, Australia, Canada, South America, and the UK have followed the EU directive since 2018. Further, the global development, testing and deployment of automated vehicles are dependent on the application of collision avoidance technologies.

A range of vehicles and objects of all size, weight, and manner utilize and interact on roadways, streets, pathways, and thoroughfares. The relative differences in the speed, location, distance, size, shape, visibility, and presence of the various vehicles that collectively inhabit roadways makes collision-free travel a constant challenge. In the U.S. alone, over 36,500 people die in vehicle-related crashes each year (1.35 million deaths worldwide). The relative differences in speed and size of vehicles and other objects that must share roadways makes lack of visibility and detection a key contributor to vehicle crashes and fatalities. Importantly, the global automotive industry has committed significant engineering skill and financial resources to developing technologies that increase the vehicle and object detection capabilities of modern cars and trucks.

Over the last fifteen years, the automotive industry has developed collision warning systems that utilize a suite of object detection sensors including radar, vision/camera, sonar, and sometimes lidar that comprise a vehicles driver assistance package. Radar sensors are a fundamental base technology present on virtually all vehicles with driver assistance capabilities and serve to detect objects in the vehicles pathway and warn the operator and/or the vehicle in able to avoid collisions.

Despite the foregoing, technological limitations like directional sensitivity and signal strength inherent in collision avoidance systems restrict the ability of automotive radar sensors to view and detect target objects at off-angles, wide fields-of-view, and at certain distance and range measurements. As such, only target objects directly in front, or at a narrow viewing angle, and with substantial reflectivity can be sufficiently perceived by the radar sensor to trigger the warning to the driver and/or the vehicle's collision avoidance system. There exists an even greater challenge when seeking to detect small aspect ratio targets like cyclists and pedestrians who typically have minimal radar cross section (RCS) return signatures. The failure of human operators and collision avoidance systems to detect small targets has led to over 800 deaths and 50,000 injuries a year to cyclists, and nearly 6,000 deaths and 137,000 injuries a year to pedestrians, in the U.S. alone. The cost of these fatalities and injuries is over $4 billion annually.

SUMMARY OF THE INVENTION

Implementations according to the present invention include a reflective sensor device that provides collision avoidance object detection systems such as automotive radars an enhanced ability to detect and thereby avoid collisions with cyclists, motorcycles, mobility devices, three and four wheeled trikes, quads, scooters, electric scooters, wheelchairs, pedestrians, joggers, and drones, unmanned aerial vehicles (UAV's), electric vertical take-off and landing aircraft (EVTOL's), watercraft, and other objects with small aspect ratio target characteristics. Implementations according to the present invention are passive and can be adapted to numerous mounting schemes, both releasable and non-releasable including but not limited to: a bike frame; seatpost; handlebar; fenders; or other placements; and to human extremities like arms and legs; and to equipment like arm bands; helmets; and attached to fabrics and clothing; or otherwise embedded into a target object. Based upon a novel corner cube reflector design and applications, with unique and specific configurations and geometries of singular or multiple corner reflectors, each apparatus can significantly increase the Radar Cross Section (RCS) measurement and Doppler and Micro-doppler signature of the target object (e.g. cyclist and pedestrians) and greatly amplify the presence of the target object at multiple angles, orientations, distances and ranges to the vehicles collision avoidance radar system.

Implementations described herein are comprised of various geometries of a single reflector; e.g., square trihedral reflector where the reflective sides meet at 90 degrees shown in (FIGS. 10-14) or a square trihedral reflector paired with one or more corner reflectors; e.g., (FIGS. 3-6) that may be square trihedral type, triangular trihedral type or rounded trihedral type and including radar reflective properties in the millimeter wavelength spectrum. Essentially, the apparatus is a radar reflector, that based on a novel design, configurations, and applications, returns a significantly larger RCS measurement to the transmitting device than would otherwise be returned without the presence of the apparatus. By utilizing the novel design and application of corner reflectors of the present invention to optimize the RCS return and Doppler and Micro-doppler signature return of small aspect ratio targets (e.g. cyclists and pedestrians), the device significantly increases the opportunity for the operator and/or the vehicle to avoid collisions.

In one preferred implementation, a corner reflector is attached directly to a bicycle, or other mobility device, for instance to the bike frame; seatpost; handlebar; fenders, or other placements; or to human extremities like arms and legs; and to equipment like arm bands; helmets; or attached to clothing or fabric; or otherwise embedded into a target object. An impinging radar signal from a vehicle approaching a target object from any direction, and from off-angles, orientations, and field-of-view, strikes the corner reflector device which returns a radar signature that makes a small aspect ratio target appear much larger. The enhanced RCS signal returned allows the automotive radar sensor to detect the target objects location and react, thus providing a warning to the operator and/or the vehicle to avoid collisions with the bicycle or other similar mobility device.

Advantages

A first advantage of the present invention is that it significantly increases the likelihood that the operator and/or the vehicle equipped with a collision avoidance radar system will be alerted to the presence of a small aspect ratio target at multiple angles, orientations, distances and ranges. By increasing the level of return signal RCS the apparatus of the present invention appears to the transmitting device to be a much larger target. The increase in RCS will enable the automotive radar device, within a sooner time period, to better recognize the presence of the cyclist, or other small aspect ratio target, thereby greatly increasing the ability of the operator and/or the vehicle to take actions to avoid a collision.

A second advantage of the present invention is that it is cost effective. This is evident since the apparatus of the present invention may be made from a variety of materials such as aluminum, sheet metal, plastics, and include various coatings that are optimized for radar reflectance. Additionally, various geometric shapes can be utilized in conjunction with coating materials to optimize the RCS return signal performance.

A third advantage of the present invention is that while the preferred embodiment is applicable to bicycles, it is also suited for other users including: pedestrians, affixed to extremities like arms and legs; and to equipment like arm bands; helmets; backpacks, and attached to clothing or fabric; or otherwise embedded into a target object.

A fourth advantage of the present invention is that its utility is based upon a novel corner cube reflector design and application, with unique and specific configurations and geometries of singular or multiple corner reflectors, each apparatus can significantly increase the radar cross section measurement of the target object (e.g. cyclist and pedestrian), and greatly amplify the presence of the target object at multiple angles, orientations, distances and ranges to the vehicles collision avoidance radar system.

Various implementations according to the present invention are described herein in conjunction with the drawings listed below. As will be evident, the apparatus of the present invention overcomes the disadvantages and omissions of the prior art and provides significant novel improvement in the field of collision avoidance.

BRIEF DESCRIPTION OF THE DRAWINGS

FIG. 2 is a diagram illustrating the ability of an example implementation according to the present invention, of a corner reflector design, geometries, and application of the present invention to signal the presence of small aspect ratio targets (e.g. cyclists) that are located in multiple distances, angles, orientations, ranges, and fields-of-view to vehicles with collision avoidance radar systems;

FIG. 3 is a top view of an example embodiment of the present invention;

FIG. 4 is a front view thereof;

FIG. 5 is a side elevation thereof;

FIG. 6 is an isometric view thereof;

FIG. 10 is a front facing view of another example embodiment according to the present invention;

FIG. 11 is a left side view thereof;

FIG. 12 is a bottom side view thereof;

FIG. 13 is a rear side view opposite that shown in (FIG. 10);

REFERENCE LISTING

Figure 1A:
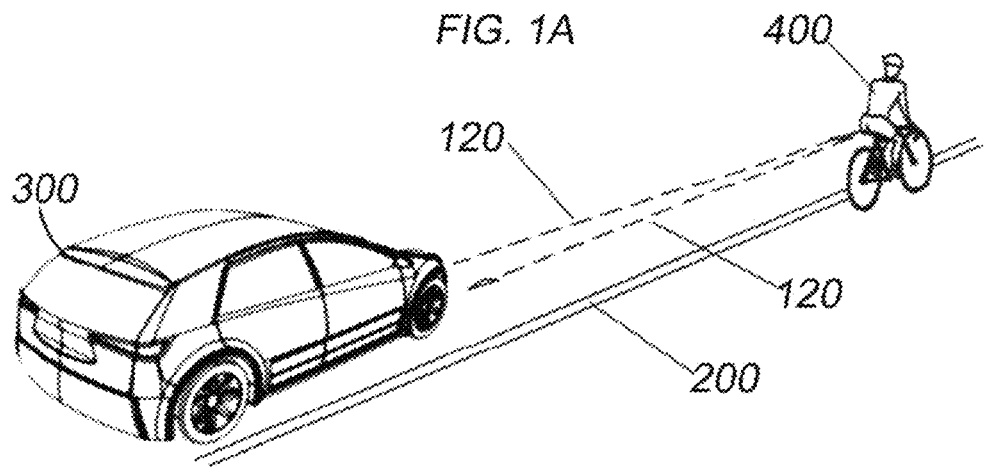
FIG. 1A is a generalized diagram that shows an example problem scenario addressed by implementations according to the present invention.
Figure 1B:
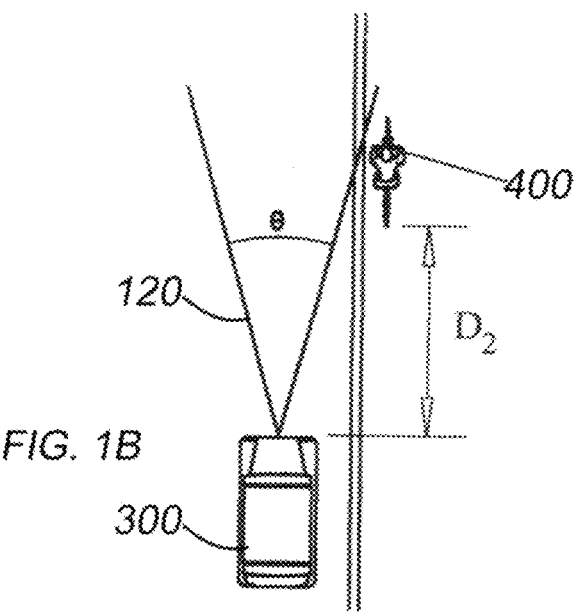
FIG. 1B is a generalized diagram of a vehicle with contemporary automotive radar technology approaching a target cyclist in a typical case where the cyclist is lacking any implementation according to the present invention.

100 Reflective Device
102 body
106 first trihedral element
108 second trihedral element
110 third trihedral element
112 edge
114 face
116 vertex
118a, 118b attachment member(s)
120 signal
121 framework
200 roadway
300 vehicle
400 cyclist

DETAILED DESCRIPTION OF THE EMBODIMENTS

As described briefly above, the apparatus of the present invention substantially enhances the likelihood of avoiding collisions between motor vehicles (cars and trucks) and small aspect ratio target objects like bicycles and other mobility devices at any angle of orientation and practical distance. Due to the high rate of closure speed between motor vehicles and a smaller object on the roadway (e.g. cyclists and pedestrians), the distance between the vehicle and the object decreases quickly. This rate of closure and the angle orientation between the vehicle and the target object makes it very difficult for the vehicle radar system to detect the target object. Failure of the vehicle radar system to detect small aspect ratio targets, like cyclists and pedestrians, leads to fatal collisions between vehicles and target objects.

FIG. 1A illustrates a problem to be solved and shows a vehicle (300) traveling on a road surface (200) approaching a target object from various angles. In this instance, the target is a cyclist (400), but other small aspect ratio targets would include motorcycles, mobility devices, wheelchairs, pedestrians and other similar objects. As can be seen in (FIG.

1B), a cyclist (400) is shown operating without the apparatus of the present invention, and absent an augmented RCS signature that would otherwise be provided by various implementations according to the present invention. Accordingly, the cyclist's presence will not be detected by the vehicle radar system sufficiently to activate a warning to the operator and/or the vehicle (300) to avoid collisions with the bicycle or other similar mobility device. In this particular example, both being off-angle and/or of small aspect ratio, the cyclist will have an RCS signature (120) insufficient to activate the vehicles collision avoidance system. This is especially true at high vehicle to target object closing speeds and substantial range distances.

FIG. 2 shows a vehicle (300) traveling on a road surface (200) approaching multiple target objects (400) from various proposed angles. In this instance, the target is a cyclist, but other small aspect ratio targets would include motorcycles, mobility devices, wheelchairs, pedestrians and other similar objects. The cyclist can be moving in any four directions, and at off-angles, and based on the fitment or attachment of the apparatus of the present invention composed of a novel corner cube reflector design and application, with unique and specific configurations and geometries of singular or multiple corner reflectors, each apparatus can significantly increase the Radar Cross Section (RCS) measurement of the target object (e.g. cyclist) and greatly amplify the presence/signal (120) of the target object in multiple angles, orientations, distances and ranges to the vehicles collision avoidance radar system. An amplified RCS return will activate the vehicles collision avoidance system to detect and react providing a warning to the operator and/or the vehicle to avoid collisions with the bicycle or other similar mobility devices. FIG. 2 also shows that the apparatus of the present invention with its novel geometric design and application of the corner reflector significantly enhances the RCS return of small aspect ratio targets at greater distances, aspect angles, and wider fields-of-view than target objects with unaided RCS signatures. Further, the enhanced RCS signature that results from deployment of the present invention provides a cyclist or other mobility device with an amplified presence to the vehicle radar system that substantially segregates and distinguishes the small aspect ratio target (e.g. cyclist) from larger aspect ratio targets in the general area. This allows cyclists to be distinguishable from cars, trucks and buses in urbanized driving scenarios.

Turning now to FIGS. 3-6, a novel corner reflector is shown in detail. The implementation body (102) includes multiple polyhedrons, and in this instance, a square trihedral reflector (106) in the center of the device, with triangular trihedral reflectors (108, 110) on each side of the device to collectively provide up to 180 degrees of reflective RCS capability for detection, measurement, and amplification of the presence of the target object from multiple angles, orientations, distances and ranges to the vehicles collision avoidance radar system. In this preferred embodiment the faces (114) of each reflector meet at a vertex (116) forming an exterior and an interior vertex. The exterior vertex is convex whereas the interior vertex is concave. Other polyhedron designs and configurations and arrays could be used without departing from the spirit of the invention. The novel corner reflector depicted including surfaces of the square trihedral reflector and/or the triangular trihedral reflectors may include plastics, metals, composites, aluminum, metal plated plastics, metal or metal infused tapes, metallic coatings, polyamide 12, and metal oxides.

Surfaces or faces of any implementation may be made from a highly reflective material such as aluminum, plated or coated plastic or similar materials, or other material known to those with skill in the art including other metals, metal oxides, nickel alloy oxide, and various plastics and metalized plastics including, but not limited to, polycarbonate, ABS, polyamide 12, epoxy, nylon, carbon fiber, etc.

Implementations according to the present invention can be adapted to numerous mounting schemes including: to a bike frame; seat post; handlebar; fenders, or other similar placements; and to human extremities like arms and legs; and to equipment like arm bands; helmets; backpacks; attached to clothing or fabric; or, otherwise embedded into a target object. The mounting scheme is important in that it establishes the alignment of each the vertex of the apparatus of the present invention in the general direction of the vehicles radar system to allow maximum exposure to the incoming radar signals at multiple angles, orientations, ranges and distances. Mounting the present invention as a device on the handlebars or some other frontal orientation of the small aspect target will allow detection from vehicles approaching from the front or side angles of the vehicle with an automotive radar system without departing from the spirit of the invention.

Figure 7:
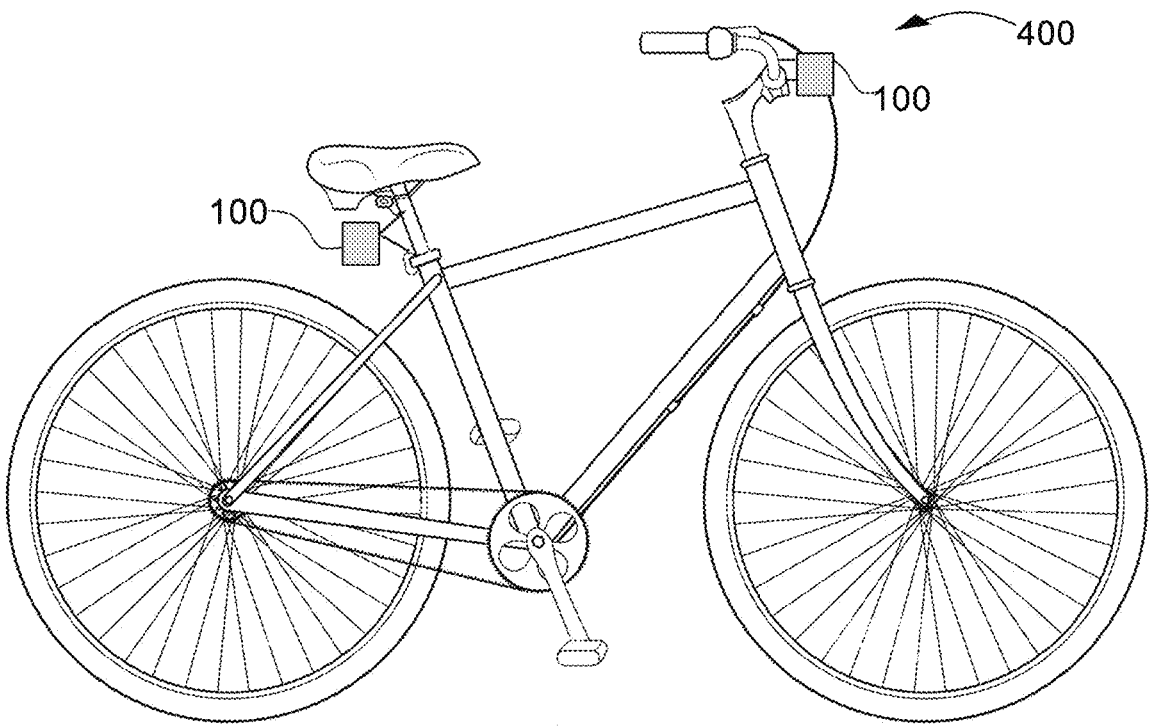
FIGS. 7-9 show various example implementations and applications of the present invention.
Figure 8:
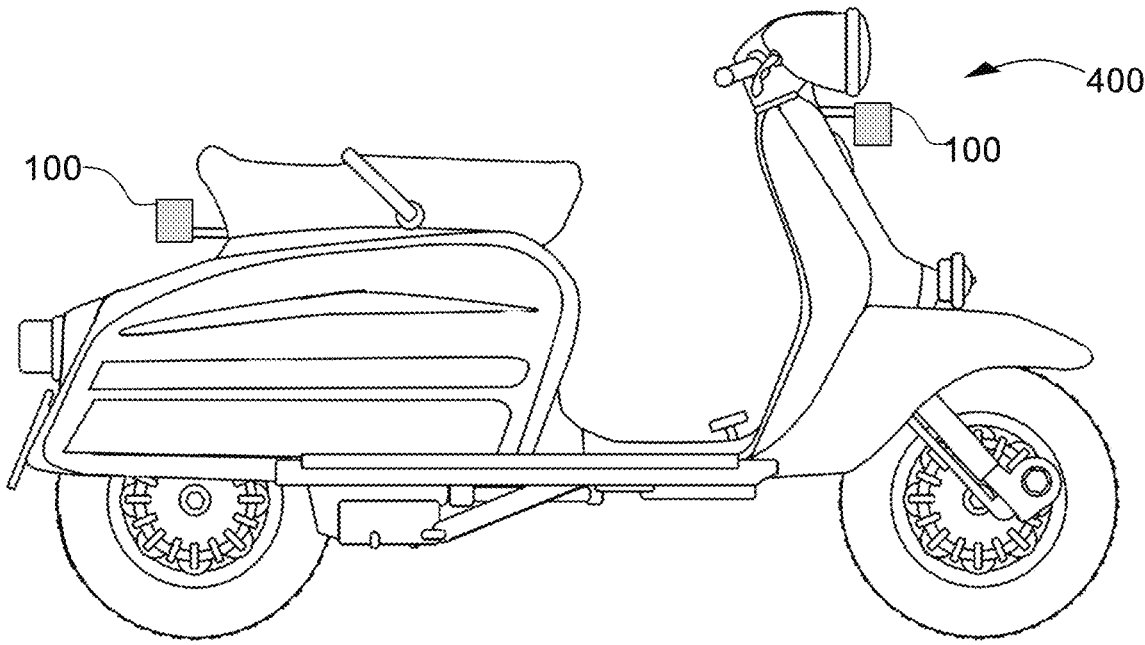
Figure 9:
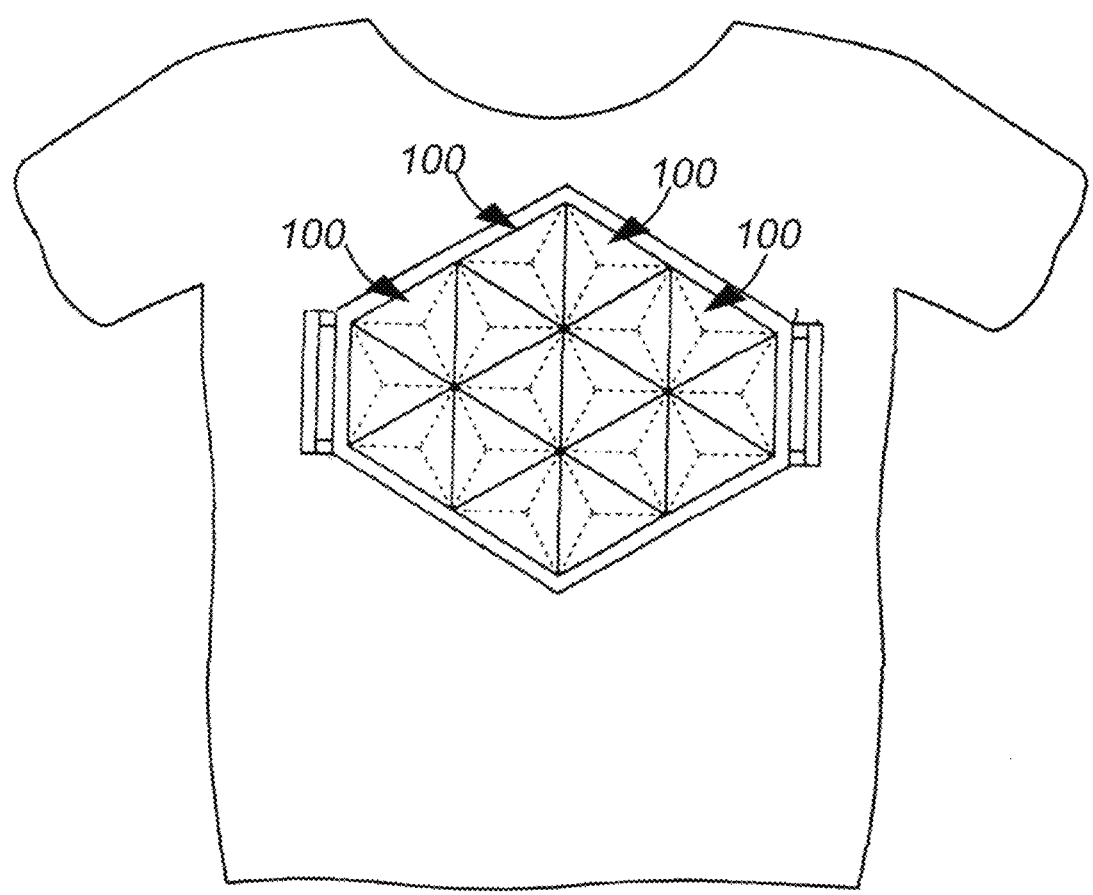
Figure 14:
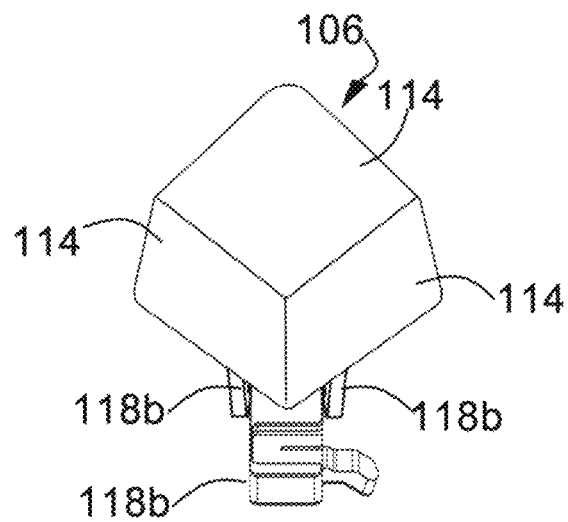
FIG. 14 is a view wherein front facing view (FIG. 10) has been rotated or tilted forward approximately 45 degrees in order to show the vertices (116) of the reflective device (100).

In FIGS. 7-9, implementations of the present invention are shown in various mounting configurations, orientations, and directions. In FIG. 7, an example implementation is mounted on both the front and rear of the bicycle or other mobility device. Mounting the present invention as a device on the handlebars or some other frontal orientation of a small aspect target will allow detection of the small aspect target by vehicles with an automotive radar system approaching from the front or side angles of the target without departing from the spirit of the invention. Additionally, mounting the present invention on the rearward seatpost and the forward facing handlebars simultaneously, or similar mounting orientations, to allow for cumulative detection in all directions, produces up to 360 degrees of detectability, and could be used to provide radar return alert signals to vehicles approaching from several, or all, directions. Similarly, FIG. 8 shows an example implementation mounted to a scooter. As previously indicated, the present invention can be adapted to numerous objects and mounting schemes including arms and legs, and on equipment like armbands, helmets, and attached to fabrics and clothing, or otherwise embedded into a target object. In FIG. 9, the radar reflective device is attached to or embedded into a jersey/shirt. Again, when based upon a novel corner cube reflector design and application, with our unique and specific configurations and geometries of singular, multiple and array reflector properties, each apparatus of the present invention will significantly increase the radar cross section (RCS) measurement of the target object and greatly amplify the presence of the target object in multiple angles, orientations distances and ranges to the vehicles collision avoidance radar system.

Moving to FIGS. 10-14, another embodiment of a novel corner reflector includes a square trihedral reflector (106) with vertices (116) and an impact resistant framework (121) thereabout. Like the embodiment shown in (FIGS. 3-6) the reflector device (100) includes attachment members (118*a*, 118*b*) that provide attachment capabilities for a wide range of mounting surfaces.

Below a non-limiting example implementation that includes the following steps: providing one or more polyhedral bodies, each polyhedral body including a square trihedral reflector and one or more triangular trihedral reflectors adjacent the square trihedral reflector; providing one or more attachment members; selecting one or more exposed portions of a movable body; coupling the attachment member(s) to the one or more exposed portions; and, wherein the selection of the one or more exposed portions is based on the probability of its exposure to radar emanating from a vehicle.

Another non-limiting example implementations includes the following steps: providing one or more polyhedral bodies, each polyhedral body including a square trihedral reflector; providing a framework to support and protect the one or more polyhedral bodies; providing one or more attachment members; selecting one or more exposed portions of a movable body; coupling the attachment member(s) to the one or more exposed portions; and, wherein the selection of the one or more exposed portions is based on the probability of its exposure to radar emanating from a vehicle.

It should be understood that the drawings and detailed description herein are to be regarded in an illustrative rather than a restrictive manner and are not intended to be limiting to the particular implementations, forms and examples disclosed. In the above-described embodiments and implementations, the size, shape and the like shown in the accompanying drawing figures can be adjusted and still remain within the scope of this disclosure. Accordingly, it is intended that this disclosure encompass any further modifications, changes, rearrangements, substitutions, alternatives, design choices, and implementations as would be appreciated by those of ordinary skill in the art having benefit of this disclosure, and falling within the spirit and scope of the following claims.

What is claimed is:

1. An apparatus for increasing a radar cross section (RCS) and amplifying Micro-doppler signatures of a small aspect ratio target comprising:
    a polyhedron body including, but not limited to:
    a square trihedral reflector including a front side and back side, the front side includes reflective surfaces configured to provide up to 180 degrees of reflective RCS capability for detection, measurement, and amplification of a presence of a target object, and the back side is non-reflective;
    an impact resistant protective framework with apertures surrounding the back side of the square trihedral reflector and the front side reflective surfaces are uncovered; and,
    one or more attachment members connected to the protective framework.

2. The apparatus according to claim 1, wherein the RCS and the Micro-doppler signature of a target object is capable of enhancement making a cyclist, or other small aspect ratio target, appear to be a substantially larger target than actual target at a distance, a range and a field of view.

3. The apparatus according to claim 1, wherein one or more surfaces of the square trihedral reflector comprising at least one of the following: plastic, metal, composites, aluminum, plated or coated plastic, metal tape or metal infused tape, metals, metal oxides, nickel alloy oxide, metalized plastics, polycarbonate, Acrylonitrile Butadiene Styrene, polyamide 12, epoxy, nylon, carbon fiber.

4. The apparatus according to claim 1, further comprising a protective structure capable of shielding reflective surfaces thereon from environmental debris that could negatively affect reflectivity of the reflective surfaces.

5. An apparatus for increasing a radar cross section (RCS) signature of a small aspect ratio target comprising:
    one or more polygonal sections including a front side and back side, the front side of each polygonal section includes reflective surfaces on at least three faces of the polygonal section, each face of the at least three faces is a similar length and width, and the faces meet at a single vertex and include a concave interior vertex and a convex exterior vertex;
    the reflective surfaces made of a material selected from at least one of the following: plastic, metal, composites, aluminum, plated or coated plastic, metal tape or metal infused tape, metals, metal oxides, nickel alloy oxide, metalized plastics, polycarbonate, Acrylonitrile Butadiene Styrene, polyamide 12, epoxy, nylon, carbon fiber;
    the apparatus is adapted to attach to or be embedded in an object, the object configured to produce a radar signature for an object size proportionally greater than the object's size, and, the back side of the one or more polygonal sections is non-reflective and includes a protective impact resistant framework with voids abutting the back side thereof and the reflective surfaces are uncovered to maximize reflectivity.

6. The apparatus according to claim 5 capable of mounting to at least one of the following: a bike frame, a seatpost, a handlebar, a fender, a scooter frame, a motorcycle body, antennas, human extremities such as arms and legs, equipment, arm bands, helmets, backpacks, clothing, hats.

7. The apparatus according to claim 5, further comprising a protective structure capable of shielding the reflective surfaces from environmental debris that could negatively affect reflectivity of the reflective surfaces.

8. The apparatus according to claim 5, further comprising:
    a mounting member providing an orientation that optimizes the positioning of reflective surfaces of the apparatus in multiple directions such that incoming radar signal(s) emitted from a radar device impinging on the apparatus will cause a reflection of the radar signal(s) back to the radar device at an increased signal level thereby causing said radar device to interpret and detect a small aspect ratio target as being of significantly greater size than actual target size at a distance, a range and a field of view.

9. The apparatus according to claim 5, wherein incoming radar signals impinge on the reflective surfaces of the apparatus, and as such, a reflected signal and thus an RCS value of a target object is enhanced, making a cyclist, or other small aspect ratio target, appear to be a substantially larger target than actual size; and,
    the increase in the RCS value will enable an automotive radar device to recognize the presence of the cyclist thereby greatly increasing the ability of an operator and/or a vehicle to take actions to avoid a collision.

* * * * *